United States Patent
Epasto et al.

(10) Patent No.: US 11,829,416 B2
(45) Date of Patent: Nov. 28, 2023

(54) SYSTEMS AND METHODS TO DETECT CLUSTERS IN GRAPHS

(71) Applicant: Google LLC, Mountain View, CA (US)

(72) Inventors: Alessandro Epasto, New York, NY (US); Renato Purita Paes Leme, Brooklyn, NY (US); Silvio Lattanzi, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 563 days.

(21) Appl. No.: 16/610,000

(22) PCT Filed: Feb. 14, 2018

(86) PCT No.: PCT/US2018/018120
§ 371 (c)(1),
(2) Date: Oct. 31, 2019

(87) PCT Pub. No.: WO2018/203956
PCT Pub. Date: Nov. 8, 2018

(65) Prior Publication Data
US 2020/0065333 A1    Feb. 27, 2020

Related U.S. Application Data

(60) Provisional application No. 62/500,221, filed on May 2, 2017.

(51) Int. Cl.
*G06F 16/901* (2019.01)
*G06F 16/906* (2019.01)
(Continued)

(52) U.S. Cl.
CPC ........ *G06F 16/9024* (2019.01); *G06F 16/906* (2019.01); *G06F 18/2163* (2023.01); *G06F 18/24147* (2023.01)

(58) Field of Classification Search
CPC . G06F 16/906; G06F 16/9024; G06K 9/6261; G06K 9/6276
See application file for complete search history.

(56) References Cited

U.S. PATENT DOCUMENTS

| | | | | |
|---|---|---|---|---|
| 6,154,220 | A | * | 11/2000 | Prakriya ............. G06F 16/9024 707/E17.011 |
| 8,195,734 | B1 | * | 6/2012 | Long ..................... G06F 16/285 708/520 |

(Continued)

OTHER PUBLICATIONS

Abrahao et al, "A Separability Framework for Analyzing Community Structure", Knowledge Discover from Data, vol. 8, No. 1, Article 5, Feb. 2014, 29 pages.

(Continued)

*Primary Examiner* — Cam Y T Truong
(74) *Attorney, Agent, or Firm* — Dority & Manning, P.A.

(57) ABSTRACT

The present disclosure provides a new framework and associated techniques, referred to herein as "ego-splitting," that enable the detection of clusters in graphs that are descriptive of networks, including highly complex networks. Ego-splitting leverages local structures within a graph known as ego-nets to de-couple overlapping clusters. For example, an ego-net can be the subgraph induced by the neighborhood of each node. Ego-splitting is a highly scalable and flexible framework, with provable theoretical guarantees. Ego-splitting reduces the complex overlapping clustering problem to a simpler and more amenable non-overlapping (also known as partitioning) problem. Ego-splitting enables the scaling of community detection to graphs with tens of billions of edges and outperforms previous solutions.

21 Claims, 8 Drawing Sheets

(51) Int. Cl.
G06F 18/21 (2023.01)
G06F 18/2413 (2023.01)

(56) References Cited

U.S. PATENT DOCUMENTS

| | | | | |
|---|---|---|---|---|
| 2015/0213370 | A1* | 7/2015 | Chakrabarti | G06F 16/9535 706/52 |
| 2016/0063037 | A1* | 3/2016 | Savkli | G06F 16/532 707/722 |
| 2016/0253696 | A1* | 9/2016 | Gui | G06Q 30/0243 705/14.42 |
| 2017/0214589 | A1* | 7/2017 | Conover | G06Q 50/01 |
| 2017/0316082 | A1* | 11/2017 | McQueary | G06N 5/02 |
| 2018/0136933 | A1* | 5/2018 | Kogan | G06F 16/148 |

OTHER PUBLICATIONS

Ahn et al, "Link Communities Reveal Multiscale Complexity in Networks", Nature, vol. 466, Aug. 10, 2010, 6 pages.
Akoglu et al, "Oddball: Spotting Anomalies in Weighted Graphs", Pacific-Asia Conference on Knowledge, Discovery and Data Mining, Jun. 21-24, 2010, Hyderabad, India, 12 pages.
Amoretti et al, "Local-First Algorithms for Community Detection", International Workshop on Knowledge Discovery, Sep. 8-10, 2016, Cagliari, Italy, 12 pages.
Arora et al, "Finding Overlapping Communities in Social Networks: Toward a Rigorous Approach", Conference on Electronic Commerce, Jun. 4-8, 2012, Valencia, Spain, 19 pages.
Balcan et al, "Finding Endogenously Formed Communities", Symposium on Discrete Algorithms, Jan. 6-8, 2013, New Orleans, Louisiana, 17 pages.
Bandyopadhyay et al, "FOCS: Fast Overlapped Community Search", Knowledge and Data Engineering, Jun. 2015, 14 pages.
Bastian et al, "Gephi: An Open Source Software for Exploring and Manipulating Networks", Association for the Advancement of Artificial Intelligence, 2009, 2 pages.
Boldi et al, "Layered Label Propagation: A Multiresolution Coordinate-Free Ordering for Compressing Social Networks", World Wide Web Conference, Mar. 23-Apr. 1, 2011, Hyderabad, India, 10 pages.
Boldi et al, "The WebGraph framework I: Compression Techniques", World Wide Web Conference, May 17-22, 2004, New York, New York, 8 pages.
Burt, "Structural Holes: The Social Structure of Competition", Harvard University Press, Cambridge, Massachusetts, 1992, 324 pages.
Buzun et al, "EgoLP: Fast and Distributed Community Detection in Billion-Node Social Networks", Conference on Data Mining, Dec. 14, 2014, Shenzhen, China, 8 pages.
Coscia et al, "Uncovering Hierarchical and Overlapping Communities with a Local-First Approach", Transactions on Knowledge Discover from Data, vol. 9, No. 1, Oct. 2014, 25 pages.
Delis et al, "Scalable Link Community Detection: A Local Dispersion-Aware Approach", Conference on Big Data, Dec. 5-8, 2016, Washington, DC, 10 pages.
Dunbar et al, "Communication in Social Networks: Effects of Kinship, Network Size and Emotional Closeness", Personal Relationships, vol. 18, No. 3, Nov. 2010, pp. 439-452.
Easley et al, "Networks, Crowds, and Markets" Reasoning about a Highly Connected World, Cambridge University Press, Jun. 10, 2010, 833 pages.
Epasto et al, "Ego-Net Community Mining Applied to Friend Suggestion", Very Large Data Bases, vol. 9, No. 4, 2015, pp. 324-335.
Epasto et al, "Ego-Splitting Framework: from Non-Overlapping to Overlapping Clusters", Conference on Knowledge, Discovery and Data Mining, Aug. 13-17, 2017, Halifax, Nova Scotia, Canada, 9 pages.
Everett et al, "Ego Network Betweenness" Social Networks, vol. 27, Issue 1, Jan. 2005, pp. 31-38.

Fortunato, "Community Detection in Graphs", arXiv:0906v2, Jan. 25, 2010, 103 pages.
Freeman, "Centered Graphs and the Structure of Ego Networks", Mathematical Social Sciences, 1982, pp. 291-304.
Girvan et al, "Community Structure in Social and Biological Networks", National Academy of Sciences of the United States of America, vol. 99, No. 12, pp. 7821-7826.
Hartwell et al, "From Molecular to Modular Cell Biology", Nature, vol. 402, Dec. 2, 1999, pp. C47-C52.
He et al, "Detecting Overlapping Communities from Local Spectral Subspaces" arXiv:1509v1, Sep. 27, 2015, 11 pages.
International Search Report and Written Opinion for PCT/US2018/018120, dated Jun. 5, 2018, 12 pages.
Khanderkar et al, "On the Advantage of Overlapping Clusters for Minimizing Conductance", Algorithmica, vol. 69, Issue 4, 23 pages.
Kumar et al, "Random Graph Models for the Web Graph", Symposium on Foundations of Computer Science, Nov. 12-14, 2000, Redondo Beach, California, pp. 57-65.
Lancichinetti et al, "Benchmarks for Testing Community Detection Algorithms on Directed and Weighted Graphs with Overlapping Communities", Physical Review, vol. 80, Aug. 2009, 8 pages.
Lattanzi et al, "Affiliation Networks", Symposium on Theory of Computing, May 31-Jun. 2, 2009, Bethesda, Maryland, pp. 427-434.
Leskovec et al, "Community Structure in Large Networks: Natural Cluster Sizes and the Absence of Large Well-Defined Clusters", arXiv:0810v1, Oct. 8, 2008, 66 pages.
Leskovec et al, "Empirical Comparison of Algorithms for Network Community Detection", arXiv:1004v1, Apr. 20, 2010, 11 pages.
Li et al, "User Profiling in an Ego Network: Co-Profiling Attributes and Relationships" World Wide Web Conference, Apr. 7-11, 2014, Seoul, South Korea, pp. 819-829.
Liben-Nowell et al, "The Link-Prediction Problem for Social Networks", Jan. 8, 2014, 19 pages.
Liu et al, "Discovering Communities in Complex Networks by Edge Label Propagation", Scientific Reports, vol. 6, Mar. 1, 2016, 10 pages.
McAuley et al, "Learning to Discover Social Circles in Ego Networks", Conference on Neural Information Processing Systems, Dec. 3-8, 2012, Lake Tahoe, Nevada, 9 pages.
McDaid et al, "Normalized Mutual Information to Evaluate Overlapping Community Finding Algorithms", arXiv:1110v1, Oct. 11, 2011, 3 pages.
McLurkin "A Distributed Boundary Detection Algorithm for Multi-Robot Systems", Conference on Intelligent Robot and Systems, Oct. 11-15, 2009, St. Louis, Missouri, pp. 4791-4798.
Palla et al, "Uncovering the Overlapping Community Structure of Complex Networks in Nature and Society", Nature, 2005, 10 pages.
Raghavan et al, "Near Linear Time Algorithm to Detect Community Structures in Large-Scale Networks", arXiv:0709v1, Sep. 19, 2007, 12 pages.
Rees et al, "Overlapping Community Detection by Collective Friendship Group Inference", Conference on Advances in Social Networks Analysis and Mining, Aug. 9-11, 2010, Odense, Denmark, 5 pages.
Ronhovde et al. "Local Resolution-Limit-Free Potts Model for Community Detection", arXiv:0803v4, Apr. 15, 2010, 16 pages.
Wasserman et al, "Social Network Analysis: Methods and Applications", Cambridge University Press, Cambridge, Massachusetts, 1994, 755 pages.
Weng et al, "Event Detection in Twitter", Conference on Weblogs and Social Media, Jul. 17-21, 2011, Barcelona, Spain, 21 pages.
Whang et al, "Overlapping Community Detection Using Seed Set Expansion", Conference on Information and Knowledge Management, Oct. 27-Nov. 1, 2013, San Francisco, California, 10 pages.
Yang et al, "Defining and Evaluating Network Communities based on Ground-Truth", Conference on Data Mining, Dec. 10-13, 2012, Brussels, Belgium, 10 pages.
Yang et al, "Detecting Cohesive and 2-Mode Communities in directed and Undirected Networks", arXiv:1401v1, Jan. 29, 2014, 11 pages.
International Report on Patentability for PCT/US2018/018120, dated Nov. 14, 2019, 9 pages.

(56) References Cited

OTHER PUBLICATIONS

McLurkin et al, "A Distributed Boundary Detection Algorithm for Multi-Robot Systems", Conference on Intelligent Robots and Systems, Oct. 11-15, 2009, St. Louis, Missouri, 8 pages.

* cited by examiner

SYSTEMS AND METHODS TO DETECT CLUSTERS IN GRAPHS

PRIORITY CLAIM

This application is based upon and claims the right of priority under 35 U.S.C. § 371 to International Application No. PCT/US2018/018120, filed Feb. 14, 2018, which claims the benefit of U.S. Provisional Application Ser. No. 62/500,221, filed May 2, 2017. Applicant claims priority to and the benefit of each of such applications. Each of such applications is incorporated by reference herein in its entirety.

FIELD

The present disclosure relates generally to graphs. More particularly, the present disclosure relates to systems and methods to detect clusters in graphs, including highly complex networks.

BACKGROUND

Detecting the clustering structure of real world networks has emerged as an important primitive in a wide range of data analysis tasks such as community detection, event detection, spam detection, computational biology, link prediction, and many others. As a result, the study of the topology of real world networks and of their clustering (or community) structure is central in modern network analysis.

In particular, in recent years, several models have been introduced to capture the community structure of networks and numerous empirical studies have analyzed the community structures at macroscopic and microscopic levels. One of the main observations in this line of work is the lack of a clear macroscopic community structure in real world networks. For instance, empirical evidence has shown that at global level it is rare to observe medium-sized communities (e.g., around 100 nodes) with clear clustering properties.

In addition, empirical evidence has shown that real-world communities are rarely detected by commonly used algorithms. In particular, real clusters overlap with each other and have many edges crossing cluster boundaries. As a result, real world graphs do not exhibit a clear clustering structure at the macroscopic level.

SUMMARY

Aspects and advantages of embodiments of the present disclosure will be set forth in part in the following description, or can be learned from the description, or can be learned through practice of the embodiments.

One example aspect of the present disclosure is directed to a method for detecting clusters in graphs. The method includes obtaining, by one or more computing devices, graph data descriptive of a first graph that includes a plurality of nodes and a plurality of edges. Each edge connects two of the nodes. The method includes determining, by the one or more computing devices, a plurality of ego-nets respectively for the plurality of nodes. The method includes partitioning, by the one or more computing devices, the ego-net for each node into one or more communities. The method includes generating, by the one or more computing devices, one or more node elements for each of the plurality of nodes. The one or more node elements for each node respectively correspond to the one or more communities associated with such node. The method includes assigning, by the one or more computing devices, each of the plurality of edges to one of the node elements of each node connected by such edge to generate an element graph. The method includes partitioning, by the one or more computing devices, the element graph into a plurality of clusters. The method includes providing, or outputting to a user, by the one or more computing device, the plurality of clusters as a result.

Another example aspect of the present disclosure is directed to a computing system. The computing system includes one or more processors and one or more tangible, non-transitory computer-readable media that collectively store instructions that, when executed by the one or more processors, cause the one or more processors to perform operations. The operations include obtaining graph data descriptive of a first graph that includes a plurality of nodes and a plurality of edges. Each edge connects two of the nodes. The operations include determining a plurality of ego-nets respectively for the plurality of nodes. The operations include partitioning the ego-net for each node into one or more communities. At least one of the nodes is partitioned into two or more communities. The operations include generating one or more node elements for each of the plurality of nodes. The one or more node elements for each node respectively correspond to the one or more communities associated with such node. The operations include assigning each of the plurality of edges to one of the node elements of each node connected by such edge to generate an element graph. The operations include partitioning the element graph into a plurality of clusters. The operations include providing, or outputting to a user, the plurality of clusters as a result.

Another example aspect of the present disclosure is directed to one or more tangible, non-transitory computer-readable media that collectively store instructions that, when executed by one or more processors, cause the one or more processors to perform operations. The operations include obtaining graph data descriptive of a first graph that includes a plurality of nodes and a plurality of edges. The operations include determining one or more ego-nets respectively for one or more analyzed nodes of the plurality of nodes. The operations include partitioning the ego-net for each of the one or more analyzed nodes into one or more communities. The ego-net for at least one of the analyzed nodes is partitioned into two or more communities. The operations include generating one or more node elements for each of the one or more analyzed nodes. The one or more node elements for each analyzed node respectively correspond to the one or more communities associated with such analyzed node. The operations include mapping, each edge that connects to one of the analyzed nodes to one of the node elements of such analyzed node to generate an element graph. The operations include partitioning the element graph into a plurality of non-overlapping clusters within the element graph. The operations include mapping the plurality of non-overlapping clusters of the element graph to the first graph to form a plurality of overlapping clusters within the first graph. The operations include providing, or outputting to a user, the plurality of overlapping clusters as a result.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

1. Overview

Figure 1A:
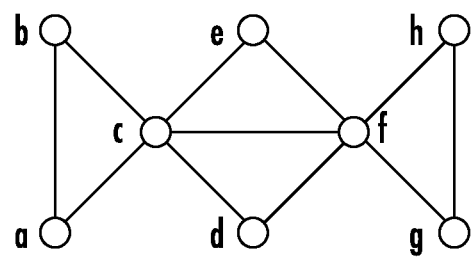
FIGS. 1A-C depict graphical diagrams of the ego-splitting framework applied to a simple graph according to example embodiments of the present disclosure.

Generally, the present disclosure is directed to a new framework and associated techniques, referred to herein as "ego-splitting," that enable the detection of clusters in graphs, including highly complex networks. Ego-splitting leverages local structures within a graph known as ego-nets to de-couple overlapping clusters. For example, an ego-net can be the subgraph induced by the neighborhood of each node. Ego-splitting is a highly scalable and flexible framework, with provable theoretical guarantees. Ego-splitting reduces the complex overlapping clustering problem to a simpler and more amenable non-overlapping (also known as partitioning) problem. Ego-splitting enables the scaling of community detection to graphs with tens of billions of edges and outperforms previous solutions.

In particular, in some implementations, the systems and methods of the present disclosure can implement the ego-splitting framework in two general phases: a local ego-net analysis phase and a global graph partitioning phase. In the local phase, the ego-net for each node is partitioned (e.g., using a partitioning algorithm) into one or more communities. The computed communities are used to split each node into one or more node elements that represent the instantiations of such node in its communities. In some instances, each node element can be referred to as a "persona" of the corresponding node. Then, in the global phase, the newly created element graph is partitioned to obtain an overlapping clustering of the original graph.

More particularly, as described above in the Background section, real world graphs typically do not exhibit a clear clustering structure at the macroscopic level. However, while the community detection problem is hard at a macroscopic level, it becomes simpler at a microscopic level. This is especially true when attention is restricted to local structures known as ego-nets (also referred to as ego-networks). For example, an ego-net can include or otherwise correspond to the subgraph induced over the neighborhood of a single node in the graph. Thus, even if a node is part of many communities, when attention is restricted to a node neighborhood the interactions and the number of edges between them are limited, simplifying the community detection problem, and reducing the technical computational resources required to implement such a problem, such as the hardware and software required to meet storage and processing requirements, and the associated power consumption. In fact, it is possible to detect high quality communities in the ego-nets community structure using out-of-the-shelf partitioning algorithms.

In view of this principle, the present disclosure provides a novel framework that is referred to as "ego-splitting." One primary concept underlying the ego-splitting framework is to use the guidance of local clustering structure to detect overlapping communities. In particular, the ego-splitting framework leverages the idea of using local clustering structure to obtain a global clustering to provide a highly scalable and flexible framework with provable theoretical guarantees. Ego-splitting reduces the complex overlapping clustering problem to a simpler and more amenable non-overlapping (partitioning) problem, reducing the technical computational resources required to implement such the complex overlapping clustering problem. This is particularly interesting because it permits use of the large body of non-overlapping clustering techniques to approach the more complex overlapping clustering problem on large-scale graphs, within the constraints of computational resources.

In particular, in some implementations, the systems and methods that implement the ego-splitting framework can operate in two general phases: a local ego-net analysis and a global graph partitioning. In the two phases, two partitioning algorithms $\mathcal{A}^l$ and $\mathcal{A}^g$ can be used as a black box.

In some implementations, to perform the local ego-net phase of ego-splitting, a computing system can construct, for every node u, the ego-net of u. The computing system can then use algorithm $\mathcal{A}^l$ to partition the ego-net of u into one or more communities. For each community in the partition, the computing system can create a new replica of u (which is referred to herein as a "node element" but can also be referred to as a "persona") that is associated uniquely with a community in the partition.

Next, the computing system can map each edge between nodes in the original graph to an edge between node elements of the corresponding nodes. The output of this step is a new graph which can be referred to as the "element graph," where each node u is replaced by a series of copies called the node elements of u.

Next, to perform the global partition phase of ego-splitting, the computing system can use a partitioning algorithm $\mathcal{A}^g$ (which is potentially the same as $\mathcal{A}^l$) on the resulting element graph and returns the clusters detected by $\mathcal{A}^g$.

Figure 1B:
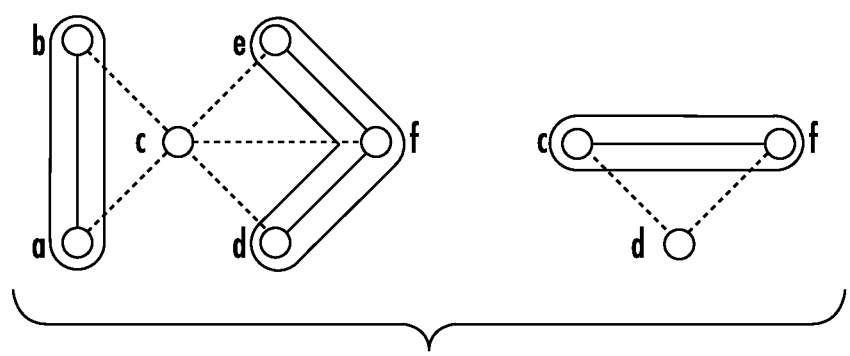
Figure 1C:
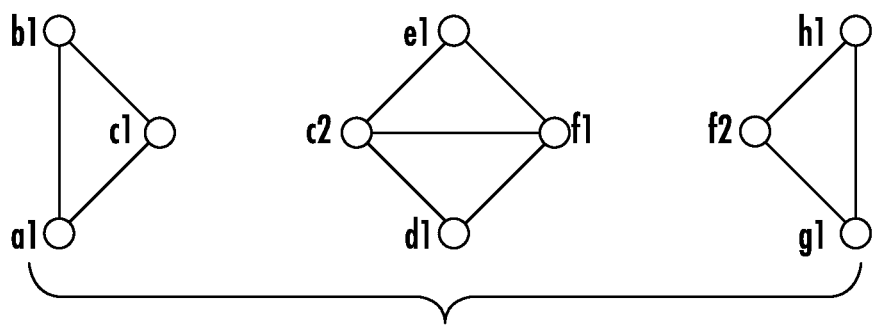

To clarify a main intuition behind the ego-splitting framework, FIGS. 1A-C provide a visual example that shows the execution of the ego-splitting method using the simple connected component algorithm for each of the clustering algorithms $\mathcal{A}^l$ and $\mathcal{A}^g$.

First, note that in the graph illustrated by FIG. 1A there are 3 overlapping communities: {a, b, c}, {c, d, e, f}, {f, g, h}. In particular nodes c and f are part of two communities. Although, when restricting the attention to the ego-net of any specific node (which recall, does not includes the node itself), the communities are naturally de-coupled. For instance, consider the ego-net of c that is illustrated in FIG. 1B, when the graph induced on c's neighborhood is considered the two communities of c are easy to identify—they correspond exactly to the two connected components {a, b} and {d, e, f}. So by using connected components, for example, the framework would be able to detect that even if there is one single node c in the graph, c has in reality two node elements and so c would be split into two different node elements: $c_1$ and $c_2$. Note that besides nodes c and f the other nodes participate in a single community. In this case the computing system keeps these nodes in a unique node element, for instance, $d_1$ in this case of d.

After the first local phase, in the second global phase the connected component algorithm can easily detect the overlapping community structure of the graph by partitioning the element graph into the following non-overlapping clusters $\{a_1, b_1c_1\}$, $\{c_2, d_1, e_1, f_1\}$ and $\{f_2, g_1, h_1\}$, which correspond to overlapping clusters in the original graph. In particular, the clusters in the original graph are {a, b, c}, {c, d, e, f}, {f, g, h}, which are overlapping.

Even if this anecdotal example may look artificial at first sight, it captures well the complexity of real world graphs where people or entities are part of a multitude of communities. For example, imagine node c in FIGS. 1A-C as a college student that participates in two clusters representing her college friends and her friends from a sports club. Clearly FIGS. 1A-C are an oversimplified scenario but, interestingly it can be observed empirically that the ego-splitting framework works well also in more complex realistic settings. While for the toy example in FIGS. 1A-C a simple articulation or bridge detection would work, the ego-splitting framework is able to dis-entangle communities even for highly connected graphs without bridges or articulations as is demonstrated in various examples below.

Notice also that more sophisticated algorithms than simple connected components can be used both at the ego-net clustering and at the node element clustering step. In fact, thanks to its flexibility, the framework of the present disclosure can be used to transform any partitioning algorithm in an overlapping clustering algorithm.

Thus, the present disclosure introduces a new ego-splitting framework to reduce the overlapping clustering problem to a non-overlapping partition problem. As described above, this approach reduces the technical resources required for implementation of the overlapping clustering problem, facilitating quicker analysis at lower technical cost, and making possible analysis of much more complex networks than is technically possible in conventional systems. The methods of the present disclosure scale easily in distributed settings, enabling the analysis of the overlapping community structure in graphs with tens of billions of edges using standard non-overlapping clustering algorithms. Detecting the clustering structure of real world networks is an important primitive in a wide range of data analysis tasks such as community detection, event detection, spam detection, computational biology, link prediction, and many others. As a result, the study of the topology of real world networks and of their clustering (or community) structure is central in modern network analysis. Therefore, the framework and techniques of the present disclosure is widely applicable to a number of different data analysis applications.

The performance of the method is analyzed both experimentally and theoretically below. Experimentally, the performance of the present algorithm is compared against state of the art ego-net based clustering algorithms and their performance is measured in terms of standard metrics for clustering detection: $F_1$-score and Normalized Mutual Information (NMI). The present disclosure demonstrates that ego-splitting outperforms other algorithms in both metrics and both in real-world graphs with labeled communities (e.g., Amazon, dblp, Livejournal, Orkut and Friendster) and in synthetic benchmark graphs.

The present disclosure also analyzes ego-splitting theoretically in a random overlapping clusters model, where clusters are chosen to be random subsets of the vertex set and for each cluster a random Erdös-Renyi graph is overlaid. The Jaccard similarity is bounded between the clusters produced by the present algorithm and the original clusters used by the model. For natural ranges of parameters, the present algorithm is able to perfectly reconstruct the clusters in the limit.

2. Example Cluster Detection Problem

In the overlapping community detection problem the goal is to design an algorithm $\mathcal{R}$ which consumes an undirected graph G=(V,E) and outputs a collection $\mathcal{S}'=\mathcal{R}(G)$ of (possibly overlapping) subsets of the node set V which can be referred to as "clusters." For example, each $C \in \mathcal{S}'$ is a subset $C \subseteq V$ and two sets C, $C' \in \mathcal{S}'$ can overlap.

Instead of specific quality function to optimize, the present disclosure takes a cluster reconstruction approach to evaluate the methods described herein. In a cluster reconstruction formulation it can be assumed that there is a set $\mathcal{S}$ of subsets of the nodes which can be referred to as "ground-truth clusters" and the algorithm is tasked with recovering such clusters. Of course, for the detection problem to be meaningful, $\mathcal{S}$ and G must be related in a way that it is possible to extract information about $\mathcal{S}$ from G.

In order for the problem to be more concrete, two different algorithm evaluation scenarios can be defined. The first is that of labeled datasets, where graphs come with metadata identifying subsets of nodes that are known to be communities and that it is desirable to retrieve. This is particularly common for social networks (many examples are shown in the experimental section). A second scenario is that of generative models, where a random process generates a graph from a set of clusters and the algorithm needs to recover those clusters having only access to the graph. The methods of the present disclosure are evaluated in this context in the theoretical analysis provided below.

Evaluating a Detection Algorithm

In most cases, exact reconstructions of the communities are unrealistic and approximate reconstructions are acceptable. Several notions of approximation can be defined in comparing two clusterings which are standard in the literature.

Given a ground truth cluster $C \subseteq V$ and reconstructed cluster $C' \subseteq V$ the precision $P(C', C)=|C \cap C'|/|C'|$ can be defined as the fraction of the reconstruction that is in the ground truth and the recall $R(C', C)=|C \cap C'|/|C|$ can be defined as the fraction of the ground truth that is in the reconstruction. The notions of precision and recall are often combined in a single number between 0 and 1 called $F_1$-score, which can be defined as:

$$F_1(C', C) = 2 \cdot \frac{P(C', C) \cdot R(C', C)}{P(C', C) + R(C', C)}$$

The notion of $F_1$ has the additional advantage of being symmetric, i.e., $F_1(C', C) = F_1(C, C')$ and of being such that $F_1(C, C') = 1$ iff the sets C and C' are equal.

Now that two clusters can be compared, metrics for evaluating the set of clusters detected can be defined as follows:

$F_1$ score: Given a collection of ground truth clusters $S$ and a collection of detected clusters $S'$, a widely used measure of accuracy is the $F_1$ score of the reconstruction with respect to the ground truth as follows:

$$F_1(S', S) = \frac{1}{|S'|} \sum_{C' \in S'} \max_{C \in S} F_1(C', C)$$

which corresponds to the average $F_1$ score of a reconstructed cluster with respect to the best match in the ground truth.

Normalized Mutual Information (NMI): Another standard measure of detection quality can be used that is based on information theory developed by Lanchinetti and Fortunato in *Benchmarks for testing community detection algorithms on directed and weighted graphs with overlapping communities*, Physical Review E, 80(1):016118, 2009, and later refined by McDaid et al. in *Normalized mutual information to evaluate overlapping community finding algorithms*, October 2011. The measure was carefully crafted to avoid various pitfalls of previous measures and it is quite involved. The papers identified immediately above provide an exact description and a comprehensive discussion of its merits.

3. Example Discussion of the Ego-Splitting Framework

A core algorithmic idea of the present disclosure is that each node in the graph is a blend of different node elements. Instead of seeking to solve the clustering problem directly, each node is first split in different node elements. This disentangles the different clusters and makes the graph simpler to cluster.

Before describing the procedure in detail, notation is established and some standard notions in graph theory are defined as follows:

Example Graph Theory Notation

An (undirected, unweighted) graph G=(V,E) consists of a finite set V of nodes and an edge set $E \subset V \times V$ such that u v for each $(u,v) \in E$ and $(u,v) \in E$ iff $(v,u) \in E$.

Note that while the present disclosure primarily discusses application of the ego-splitting framework to undirected and unweighted graphs, the ego-splitting framework and associated techniques could also be adapted and applied to directed and/or weighted graphs.

A non-overlapping clustering algorithm $\mathcal{A}$ produces for each graph G=(V,E) a partition $\mathcal{A}(G) = (V_1, \ldots, V_t)$ of variable size. The notation $np_{\mathcal{A}}(G) = t$ is used to denote the number of sets in the partition. The fact that $\mathcal{A}(G)$ is a partition means that $V_i \cap V_j = \emptyset$ for $i \neq j$ and that $V_1 \cup \ldots V_t = V$. An example non-overlapping clustering algorithm is the connected components algorithm, which simply splits the graph into connected components. However, many other non-overlapping clustering algorithms exist and can be used in the context of the present disclosure.

Given a graph G=(V,E) and a subset of nodes $U \subset V$, the induced graph can be defined as $G[U] = (U, E \cap U \times U)$. For a node $u \in V$, the neighborhood of u consists of the set of nodes connected to it $N_u = \{v; (u,v) \in E\}$ and the ego-net of u consists of the graph induced on the neighborhood $G[N_u]$. The ego-net represents the local view from node u on the graph connections (notice that the ego-net of u does not include the node u).

Example Framework Implementation

The ego-splitting framework provides a general methodology for constructing an overlapping clustering algorithm starting from two (possibly equal) non-overlapping clustering algorithms: the local clustering algorithm $\mathcal{A}^l$ and the global clustering algorithm $\mathcal{A}^g$. In some implementations, the ego-splitting algorithm processes a graph G and outputs a set of clusters $S'$ as follows:

Step 1: For each node u the local clustering algorithm is used to partition the ego-net of u. Let $\mathcal{A}^l(G[N_u]) = \{N_u^1, N_u^2, \ldots, N_u^{t_u}\}$ where $t_u = np(\mathcal{A}^l, G[N_u])$.

Step 2: Create a set V' of node elements. Each node u in V will correspond to $t_u$ node elements in V' denoted by $u_i$ for $i=1, \ldots, t_u$.

Step 3: Add edges between node elements. If $(u,v) \in E$, $v \in N_u^i$ and $u \in N_v^j$ then add an edge $(u_i, v_j)$ to E'.

Step 4: Apply the global clustering algorithm $\mathcal{A}^g$ to G'=(V', E') and obtain a partition $S''$ of V'.

Step 5: For set $C' \in S''$ in the partition of V' associate a cluster $C(C') \subseteq V$ formed by the corresponding nodes of V, i.e., $C(C') = \{u \in V | \exists i \text{ s.t.} u_i \in C'\}$. Output $S' = \{C(C') | C' \in S''\}$.

Figure 2A:
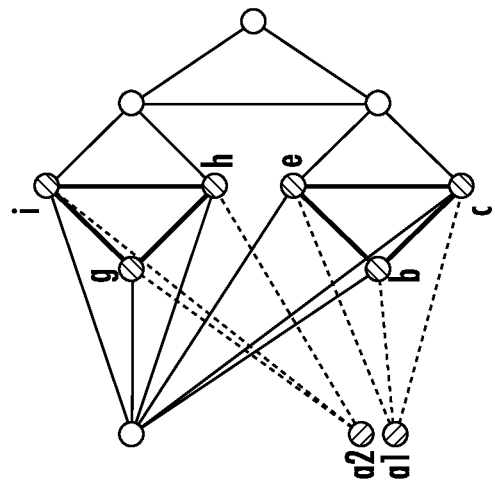
FIGS. 2A-E depict graphical diagrams of an example application of the ego-splitting framework to generate an element graph according to example embodiments of the present disclosure.
Figure 2B:
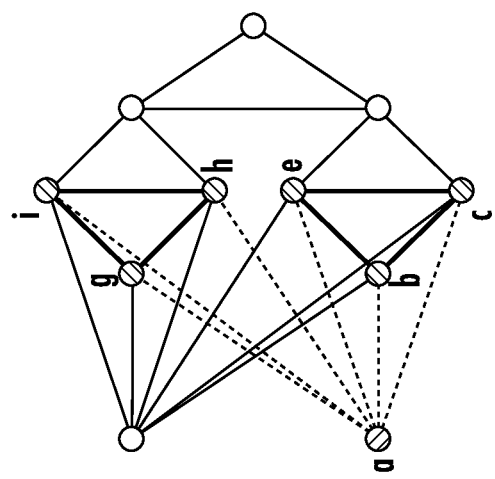
Figure 2C:
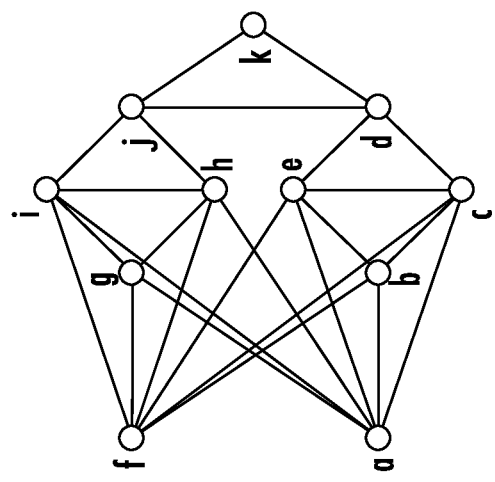
Figure 2E:
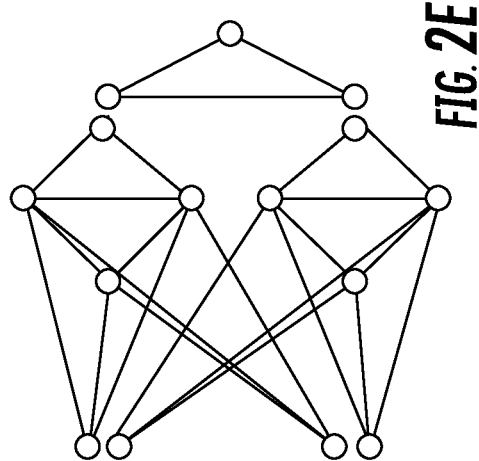
Figure 2D:
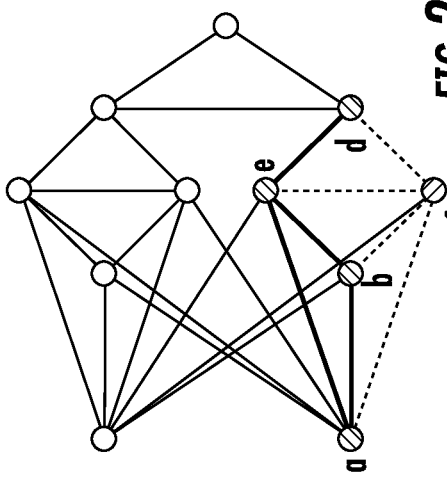
Figure 3A:
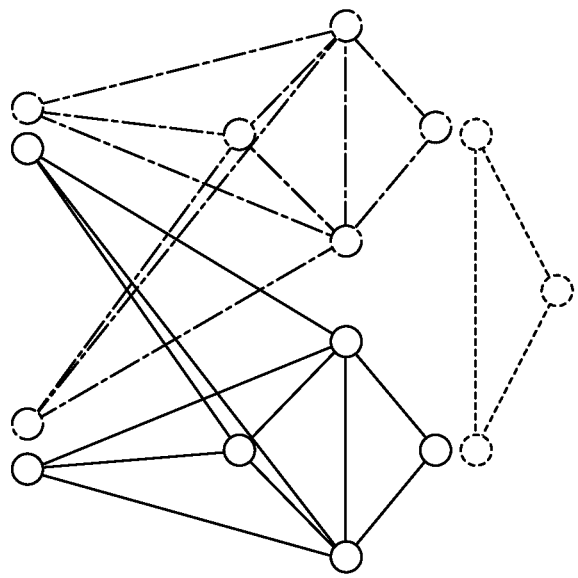
FIGS. 3A-B depict graphical diagrams of an example application of the ego-splitting framework to cluster an element graph according to example embodiments of the present disclosure.
Figure 3B:
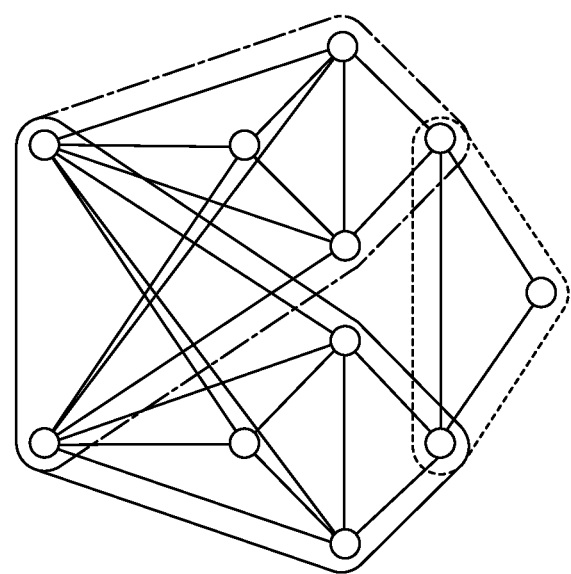

FIGS. 2A-E illustrate an example execution using connected components as clustering method. FIG. 2A illustrates an original graph G. FIG. 2B illustrates Step 1 for node a: the ego-net $G[N_a]$ is identified and partitioned. In FIG. 2C, a node element of a is added for each community of the ego-net (Step 2). For example, node element $a_1$ is associated with nodes b, c, e. In FIG. 2D, the same process is performed for node c, but since the ego-net of node c is associated with only one community, a single node element of c is added and associated with a, b, e, d. After this is done for all nodes (e.g., sequentially or in parallel), the element graph is built, as depicted in FIG. 2E. In this graph there is an edge for each edge in the original graph. For example, for edge (a, c) in the original graph, an edge is added between the node element of a associated with c (i.e. the node element of a associated with the community to which c belongs in the ego-net of a) and the node element of c associated with a (Step 3). FIG. 3A depicts Step 4 where the global non-overlapping partitioning is applied to the element graph to obtain clusters. Thus, FIG. 3A illustrates a non-overlapping partition of the element graph. Step 5 is illustrated in FIG. 3B where the clusters defined on node elements are mapped to overlapping clusters defined on original nodes. Thus, FIG. 3B illustrates overlapping clusters in the original graph.

Clustering edges: The transformation from the original graph to the graph of node elements can increase the number of nodes in the graph, but keeps the number of edges constant, so in terms of memory, the element graph consumes approximately the same space as the original one. Also, since there is a one-to-one mapping of the edges in both graphs, the non-overlapping partitions of the element graph also imply a clustering of the edges in the original graph. Each edge can be said to belong to a known cluster.

In that sense, the methodology described herein can be also viewed as an edge-disjoint clustering approach.

Ego-splitting at scale: A naive way to bound all ego-nets could be prohibitively expensive, at the order of O(nm) for n=|V| and m=|E|. A combinatorial bound on the number of triangles has been used to show that all ego-nets can be constructed in time $O(m^{3/2})$, which is a considerable gain for sparse graphs. Indeed, the bound in practice can be much better than $O(m^{3/2})$ and depends directly on the number of triangles in the graph. It has also been shown that if T is the time to cluster a graph with m edges, the total work to build all ego-nets and cluster them is $O(\sqrt{m}T+m^{3/2})$. Furthermore, it has been shown that this step can be performed in two rounds of MapReduce. One more step is required to build the element graph and one to associate the clusters of the element graph to the original nodes. Taking those results together provides the following theorem:

Theorem 3.1: If $T_l(m)$ and $T_g(m)$ are the total work of the local and global algorithms on a graph of size m (respectively), $R_g$ is the number of rounds of MapReduce required by the global partition algorithm and if the local partition can be run in memory for each ego-net, the ego-splitting framework can be implemented in $4+R_g$ rounds of MapReduce with total work $O(m^{3/2}+\sqrt{m}T_l(m)+T_g(m))$.

Notice for instance that if the both the local and global partitioning algorithms are O(m), and if the global partitioning operates in O(1) rounds, then the entire approach can be implemented using $O(m^{3/2})$ total work and O(1) rounds.

4. Example Discussion of Provable Reconstruction Guarantees

The present disclosure provides an example generative model with overlapping clusters in which the techniques of the present disclosure are able to reconstruct most of the clusters exactly by using the connected component algorithm as a non-overlapping partition algorithm both in the ego-net clustering phase and in the element graph clustering phase. Connected component is arguably the simplest (and most rudimentary) non-overlapping clustering algorithm possible, but its analysis sheds light on the ability of the ego-splitting framework to achieve provable guarantees even using a simple partitioning method as a building block. It is conceivable that using more sophisticated algorithms allows to prove guarantees in other more difficult models.

In the example model there are k clusters and each node $u \in V$ is assigned to a cluster $C \in \mathcal{S}$ iid with probability q. Now, between two nodes of each cluster an edge is added with probability p. A different way to describe the model is that k random subsets are selected and an Erdös-Renyi graph is overlaid on each of those subsets. The graph obtained by the union of such random graphs is presented and the task is to reconstruct what are the original subsets chosen.

It will be demonstrated that for a range of parameters, it is possible to reconstruct most of the random sets with high probability. The model does not necessarily correspond to any real-world network. Instead, the goal is simply to show that even in highly-connected graphs with heavily overlapping clusters, it is possible to disentangle them by analyzing the local ego-net structures using a simple clustering algorithm in the ego-splitting framework.

Random Overlapping Clusters: The generative process $\mathcal{P}(n, k, q, p)$ can be defined as the random process that starts with a set of n nodes V=[n]. A collection of k subsets $\mathcal{S}$ can be sampled as follows: from 1 to k, sample $C \in \mathcal{S}$ by adding each node $u \in V$ to C with probability q, independently.

Now, G can be sampled as follows: visit each $C \in \mathcal{S}$ and, for each, sample the edge sets $E_C$ as follows: for each u, $v \in C$ with u≠v, add edge (u,v) to $E_C$ with probability p. In other words, $E_C$ is the edge set of an Erdös-Renyi graph with vertex set C. Now the edge set of the G is simply the union $E = \cup_{C \in \mathcal{S}} E_C$.

Note that the same edge (u,v) can be present in more than one set $E_C$. In such case, still only a single edge is added to E.

Jaccard similarity of the reconstruction: The ego-splitting algorithm will be given access to G and will process it and produce a set of clusters $\mathcal{S}'$. For sake of the theoretical analysis, the quality of the reconstruction can be measured using the simple Jaccard similarity over the set of clusters:

$$J(\mathcal{S}, \mathcal{S}') = \frac{|\mathcal{S} \cap \mathcal{S}'|}{|\mathcal{S} \cup \mathcal{S}'|}$$

The Jaccard similarity is such that $0 \leq J(\mathcal{S}, \mathcal{S}') \leq 1$ and $J(\mathcal{S}, \mathcal{S}')=1$ iff the reconstruction is exact, i.e., $\mathcal{S}=\mathcal{S}'$. Experimental evaluation of the algorithm showed results for other more nuanced and widely used quality measures like $F_1$ score and NMI. Notice that Jaccard similarity as defined is a very demanding measure (it considers a cluster with a single error as entirely wrong) and implies also bounds on $F_1$, since:

$$F_1 = \frac{\sum_{C' \in \mathcal{S}'} \max_{C \in \mathcal{S}} F_1(C', C)}{|\mathcal{S}'|} \geq \frac{|\mathcal{S} \cap \mathcal{S}'|}{|\mathcal{S}'|} \geq \frac{|\mathcal{S} \cap \mathcal{S}'|}{|\mathcal{S} \cup \mathcal{S}'|} = J$$

One main result is as follows:

Theorem 4.1: If $\mathcal{S}$ and G are sampled from a $\mathcal{S}(n, k, q, p)$ with $kq \geq 1$ and $p \geq c' \log(npq/2)/(npq/2)$, then:

$$\mathbb{E}[J(\mathcal{S}, \mathcal{S}')] \geq 1 - nk \exp(-\Omega(np^2q)) - O(n^3k^2p^2q^6)$$

Notice that the assumption $kq \geq 1$ is natural as otherwise nodes have fewer than one cluster in expectation.

Given the number of parameters in the random overlapping clusters model, its meaning might be less intuitive, so first consider the following example:

Example 4.2

In the random overlapping clusters model, for $0 < \varepsilon < \delta \frac{1}{6}$ constant, let k=n, $q=n^\varepsilon/n$ and $p=1/n^{\varepsilon/4}$. Under those parameters each node is on average on $kq=n^\varepsilon$ clusters. Each cluster has average size $nq=n^\varepsilon$. So a simplified calculation will provide that the degree of each node is roughly: $n^\varepsilon \cdot n^\varepsilon \cdot p = n^{1.75\varepsilon}$. Since the theorem conditions holds, the Jaccard coefficient is $\mathbb{E}[J(\mathcal{S}, \mathcal{S}')] \geq 1 - O(n^{5.5\varepsilon}/n)$.

Example 4.3

Set k=n, q=clog(n)/n (for a large enough constant c) and p=O(1). Each node is on average on O(log n) clusters and each cluster has average size O(log n). The degree of each node is $O(\log^2 n)$. Since the theorem conditions hold, the Jaccard coefficient is $\mathbb{E}[J(\mathcal{S}, \mathcal{S}')] \geq 1 - O((\log^6 n)/n)$.

In either example as $n \to \infty$ the similarity $\mathbb{E}[J(\mathcal{S}, \mathcal{S}')] \to 1$ so perfect reconstruction is achieved in the limit.

Proof of Main Theorem

Some main tools include Chernoff bounds and the connectivity threshold in the Erdös-Renyi model. The following version of Chernoff bounds is used: if $X_i \in [0,1]$ are independent random variables and $\mu = \mathbb{E}[\Sigma_i X_i]$, then:

$$\mathbb{P}\left(\left|\sum_i X_i - \mu\right| \leq \varepsilon\mu\right) \geq 1 - 2\exp(-\varepsilon^2 \mu/4)$$

The other probability statement used is the following. Let G(n, p) be the Erdös-Renyi random graph on n nodes where each edge is added with probability p. The following classical lemma bounds the probability of the graph being connected:

Lemma 4.4: In the Erdös-Renyi random graph G(n, p) if $p \geq 6 \log(n)/n$, then $$\mathbb{P}[G(n,p) \text{ is connected}] \geq 1 - \exp(-\Omega(np))$$

The proof of this lemma is standard and thus omitted.

A first step in proving the theorem is to analyze the connectivity of the ego-net of u. For each $C \in \mathcal{S}$, let $G_C = (V, E_C)$ and define $N_u^C$ to be the neighborhood of u in graph $G_C$. Since the final graph G is the union of the edges of the $G_C$ graphs, $N_u = \cup_{C \ni u} N_u^C$.

Ideally one could look at the induced graph $G[N_u]$ and from it identify the sets $N_u^C$ and split u into $k_u$ node elements, where $k_u = |\{C \in S; u \in C\}|$. If all $N_u^C$ are disjoint and each is a connected component of $G[N_u]$, then the task is completed.

A first statement is that for each cluster C and each $u \in C$, the graphs $G_C[C]$ and $G_C[N_u^C]$ are connected with high probability. The proof follows from concentration arguments. For each C, bound the probability that $|C|$ is at least $\frac{1}{2} \mathbb{E} |C|$ using Chernoff bounds and condition on that event. Lemma 4.4 can be used to bound the probability that $G_C[C]$ is connected. For $G_C[N_u^C]$ the same argument can be done being more careful regarding which events to condition on. The proofs of the following lemmas is omitted for conciseness:

Lemma 4.5: If $p \geq 6 \log(npq/2)/(npq/2)$, then with at least $1 - nk \exp(-\omega(np^2q))$ probability, the graph G[C] is connected for all $C \in \mathcal{S}$ and $G[N_u^C]$ is connected for all $u \in C \in \mathcal{S}$.

The previous lemma shows that with high probability, node u won't split $N_u^C$ when performing the ego-splitting operation using connected components. However, it is also possible for two clusters to be wrongly merged. The next lemma describes the necessary conditions so that a cluster can be exactly reconstructed:

Lemma 4.6: Fix a cluster C, if for all $u \in C$ the following conditions hold:
(1) the induced graph G[C] is connected;
(2) the induced graph $G[N_u^C]$ is connected; and
(3) there are no edges between $N_u^C$ and $N_u - N_u^C$;
then ego-splitting with connected component reconstructs cluster C exactly.

Proof: The three conditions guarantee that for each $u \in C$, when the graph $G[N_u]$ is analyzed, the set $N_u^C$ will be a connected component, so the local step of ego-splitting will create a node element of u associated with $N_u^C$. This node element can be named $u_C$.

For each $v \in N_u^C$, the node elements $u_C$ and $v_C$ are connected in the node elements graph. This component can't contain any other node elements than $u_C$ for $u \in C$, otherwise it would imply an edge from $N_u^C$ to $N_u - N_u^C$.

The following corollary follows directly from the proof of the previous lemma:

Corollary 4.7: If the induced graph $G[N_u^C]$ and the induced graph G[C] is connected for all C and all $u \in C$, then each connected component of the node elements graph corresponds to a cluster $C \in \mathcal{S}$ or to an union of clusters in $\mathcal{S}$. Moreover, under this condition, ego-splitting using connected components outputs at most k clusters.

Proof: In the conditions of the corollary, each node u will have at most $k_u = |\{C; C \ni u\}|$ node elements. A node element of u can be said to be compatible with cluster C if the connected component of $G[N_u]$ corresponding to it contains $N_u^C$. Each node element is compatible with at least one cluster (but can be compatible with more than one). Now, by the same argument as in Lemma 4.6, for each fixed $C \in \mathcal{S}$, all node elements compatible with cluster C are connected. Therefore, the node elements graph has at most k connected components.

Lemma 4.6 provides that if all induced graphs G[C] and $G[N_u^C]$ are connected, there is only one source of errors: edges from $N_u^C$ to $N_u - N_u^C$. It can be said that an edge (v,w) is bad for u, C if u, $v \in C$, $v \in N_u^C$, $w \in N_u - N_u^C$ and (v,w) is in G.

Lemma 4.8: Assuming $kg \geq 1$, given u, v, $w \in V$ and C, an edge (v,w) is bad for u, C with probability $O(k^2 q^6 p^3)$.

Proof: u, $v \in C$, $v \in N_u^C$ and $w \notin C$ are needed which happens with probability $pq^2 (1-q)$. Now, to bound the probability that edges (v,w) and (u,w) are in the graph, take the union bound over the following event that there are clusters C', $C'' \neq C$ such that u, $v \in C'$, v, $w \in C''$, (u,w) is added to $G_{C'}$ and (v,w) is added to $G_{C''}$.

If $C' \neq C''$, the probability that u, v, $w \in C'$ and edges (u,v) and (v,w) are added is: $q^3 p^2$.

If $C' \neq C''$, the probability that u, $v \in C'$, v, $w \in C''$ and edges (u,v) and (v,w) are added are: $q^4 p^2$.

So taking the union bound, the probability of a bad event is $O(pq^2 (1-q)[kq^3 p^2 + k^2 q^4 p^2]) = O(k^2 q^6 p^3)$.

Proof of Theorem 4.1: Let D denote the event that G[C] and $G[N_u^C]$ are connected for every $C \in \mathcal{S}$ and $u \in C$. The probability of $\mathbb{P}[D]$ is bounded by Lemma 4.5.

If edge (v,w) is bad for u, C it can be said that a bad edge event occurred for (v, w, u, C). Lemma 4.8 bounds the probability of each bad edge event. So if B is a random variable measuring the total number of bad edge events, then: $\mathbb{E}[B] = O(n^3 k^3 q^6 p^3)$ by Corollary 4.7, conditioned on D, $|\mathcal{S}'| \leq |\mathcal{S}|$. Also, each bad edge can cause at most two clusters to be merged, therefore: $|\mathcal{S}'| \geq |\mathcal{S}| - 2B$. This implies a bound on the size of the union $|\mathcal{S} \cup \mathcal{S}'| = |\mathcal{S}| - |\mathcal{S} \cap \mathcal{S}'| \leq 2k - (k - 2B) = k + 2B$. Now, the Jaccard similarity can be bounded as:

$$J(\mathcal{S}, \mathcal{S}') = \frac{|\mathcal{S} \cap \mathcal{S}'|}{|\mathcal{S} \cup \mathcal{S}'|} \geq \frac{k - 2B}{k + 2B} = 1 - \frac{4B}{k + 2B} \geq 1 - \frac{4B}{k}$$

Computing Expectations:

$$\mathbb{E}[J(\mathcal{S}, \mathcal{S}')] \geq \mathbb{E}[J(\mathcal{S}, \mathcal{S}') | D]\mathbb{P}[D] = \left(1 - \frac{4\mathbb{E}[B | D]}{k}\right)\mathbb{P}[D]$$

Using that $\mathbb{E}[B|D] \mathbb{P}[D] \leq \mathbb{E}[B]$ and substituting the bounds for $\mathbb{E}[B]$ and $\mathbb{P}[D]$ provides the desired result.

Remarks about the model: the example model can also be extended to consider edges from two nodes that don't share a cluster. The usual way to incorporate this to the model is to add an edge between any two nodes with some probability r.

5. Example Experiments

Experimental Setup

An example instance of the ego-splitting framework was implemented using a large-scale distributed computing infrastructure based on MapReduce.

Clustering algorithms: The ego-splitting framework can use any non-overlapping clustering algorithm to partition the ego-nets and the element graph (the two algorithms need not to be the same). For an experimental evaluation, iterative label propagation clustering algorithms were used as non-overlapping partitioners in both phases. This choice is motivated by two reasons. First, label propagation algorithms are highly scalable and can be easily implemented in distributed settings. Second, previous ego-net based works have used successfully label propagation algorithms.

A standard non-overlapping label propagation method was used which is based on the Absolute Potts Model technique. See, e.g., P. Ronhovde and Z. Nussinov, *Local resolution-limit-free potts model for communication detection*, Phys. Rev. E, 2010. This same algorithm has been used to cluster ego-nets in A. Epasto et al., *Ego-net community mining applied to friend suggestion*, VLDB, 9(4):324-335, 2015 and a full description of the algorithm is omitted here in the interests of conciseness. In example experiments of the ego-splitting framework, the parameter was set as follows: $\alpha=0.1$ (the penalty for missing a neighbor with a certain label). During the ego-net clustering phase, an in-memory version of this algorithm was applied to cluster the ego-net. For the larger datasets, during the element graph clustering step, the graph may not fit in memory, so a distributed variant of the algorithm can be used. In this variant each label update iteration is carried out in parallel and $\alpha=0$.

Pre-processing and post-processing: The following two heuristics can be used to, in at least some instances, improve both the scalability and the accuracy of the methods of the present disclosure.

First, the graphs can be preprocessed to restrict the analysis to at most 2000 neighbors of each node. If a neighbor v of u is not processed in the ego-net of u, the edge can be discarded in the element graph that corresponds to (u,v). This, besides increasing scalability, also improves the accuracy of the algorithms as high degree nodes are usually hubs connecting multiple communities so using them in the ego-nets can confuse the community structure.

Second, the overlapping communities produced by the algorithm can be post-processed by discarding communities of size at most 4. This is because small communities are less informative. Some previous works have used a more complex post-processing of the output communities which was $O(n^2)$ while the post-processing described herein is straightforward and fast.

Comparison with Other Algorithms

An example implementation of the methods of the present disclosure was compared with a state of the art ego-net based overlapping clustering algorithm, which is known as DEMON and described in M. Coscia et al., *Uncovering hierarchical and overlapping communities with a local-first approach*, TKDD, 2014. For the DEMON algorithm, the parameter was set to $\epsilon=1$ in the post-processing as suggested (i.e. overlapping clusters are merged if and only if one is subset of the other). Consistent with the method of the present disclosure, communities of size at most 4 are discarded.

As a baseline, an off-the-shelf distributed overlapping label propagation algorithm (hereinafter referred to as OLP) was used. In this OLP method, nodes are allowed to retain up to k most frequent labels. Then a node is assigned to all the at most k clusters defined by the nodes that have retained a label. In the experiments, k=3 was fixed and communities of size at least 5 were kept.

Datasets

Synthetic benchmarks: In the previous section it was shown how the methods of the present disclosure can provably reconstruct highly overlapping communities in a simple stylized generative model. For the experimental evaluation random graphs were employed with planted overlapping clusters produced by the more widely used and sophisticated model of Lanchinetti et al., *Benchmarks for testing community detection algorithms on directed and weighted graphs with overlapping communities*, Physical Review E, 80(1):016118, 2009. This model was chosen for consistency with previous ego-net based works and because the model replicates several properties of real-world graphs, such as power law distribution of degrees, varying community sizes and membership of nodes in varying community number.

A detailed description of the model can be found in the paper referenced above. With the code provided online by the authors, 3 sets of graphs referred as Benchmark-0.01, Benchmark-0.1 and Benchmark-0.3, respectively, were generated. Each set of graphs contains 10 random instantiation of the model with the same settings, and averages over those 10 graphs for all algorithms are reported. The Benchmark-0.01 consists of the following settings: (N=1000, k=25, maxk=50, mu=0.01, minc=20, maxc=50, on=500, om=3). Benchmark-0.1 and Benchmark-0.3 instead have the following settings (N=1000, k=10, maxk=50, minc=5, maxc=50, on=100, om=2) and mu set to 0.1 and 0.3, respectively.

Real-world graphs: A set of widely used graphs (amazon, dblp, livejournal, orkut, friendster) that have ground truth clusters and are available from the SNAP collection were also analyzed. For these graphs, the dataset with top quality communities was used as ground-truth. The details of the graphs are reported in Table 1. Table 1 also reports the number of node element nodes identified by the ego-splitting framework using label propagation as clustering algorithm.

TABLE 1

Statistics on the real-world graphs used

| Graph | Nodes | Edges | Node element nodes |
|---|---|---|---|
| amazon | 334,863 | 1,851,744 | 799,080 |
| dblp | 317,080 | 2,099,732 | 611,068 |
| livejournal | 3,997,962 | 69,362,378 | 22,970,759 |
| orkut | 3,072,441 | 234,370,166 | 69,030,8073 |
| friendster | 65,608,366 | 3,612,134,270 | 1,492,532,217 |
| clueweb12 | 955,207,488 | 67,823,249,559 | 55,433,497,920 |

The algorithms of the present disclosure were also run on the clueweb12 graph which is web graph with tens of billions of edges but for which no ground truth clusters exist. All graphs are made undirected ignoring the direction of the edges if present.

Results on Synthetic Benchmarks

Figure 4A:
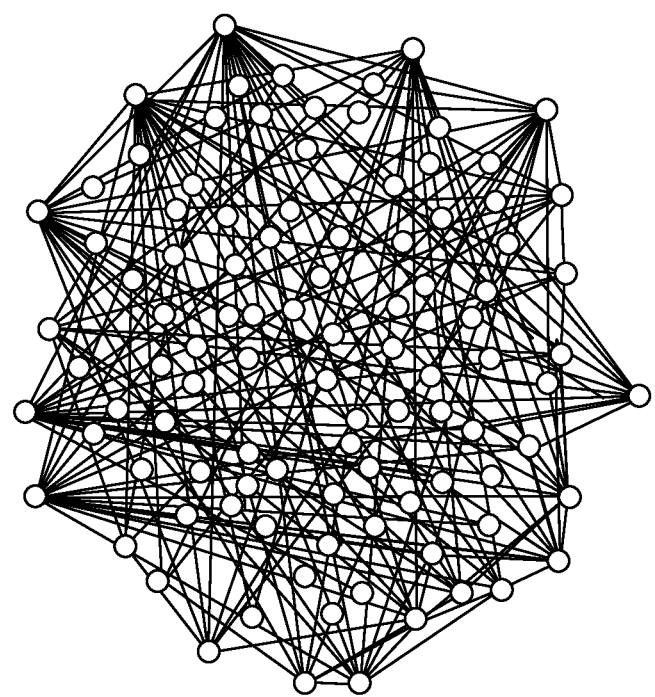
FIGS. 4A-B depict visualizations of an example graph and its corresponding example element graph according to example embodiments of the present disclosure.
Figure 4B:
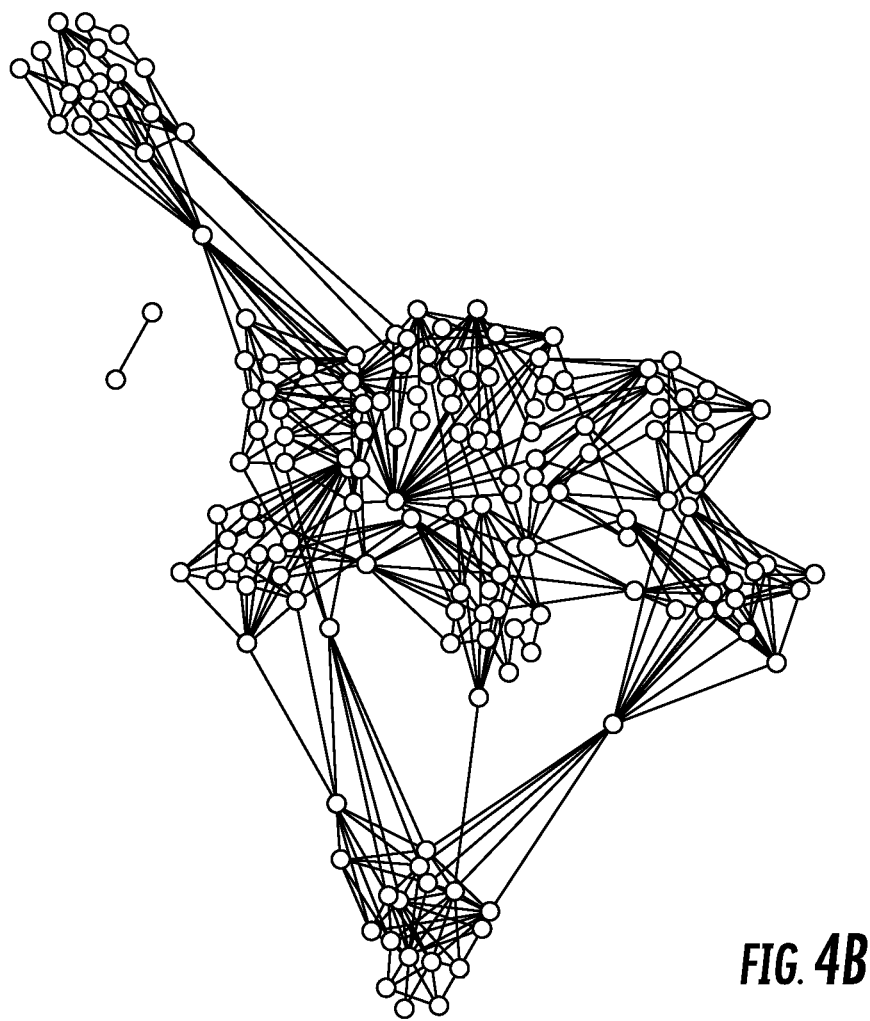

Example element graph: To gain an insight on how the ego-splitting framework operates, a visualization of a smaller synthetic graph produced with the Lanchinetti et al. model is first provided. For sake of visualization a graph with only 100 nodes and 9 highly overlapping ground-truth communities is used. FIGS. 4A-B respectively show the original graph and the element graph output by the method of the present disclosure. Both graphs have 1269 edges while the element graph has 164 nodes (from the 100 nodes in the original graph). The shadings represent the communities identified on both graphs based on a standard non-overlapping modularity-based algorithm of the Gephi visualization tool, which is described by M. Bastian et al., Gephi: *An open source software for exploring and manipulating networks,* 2009. It is possible to observe that while the community structure in the first graph is not immediately clear, in the second the clusters are visibly more separated. In fact, in the first graph, only 5 communities were found by the Gephi tool with a modularity of 0.25 while in the second 8 communities were found with a higher modularity of 0.60. This visually shows how the framework of the present disclosure is able to disentangle the communities.

Quantitative analysis: A more quantitative analysis is now provided of the accuracy of the algorithm of the present disclosure in reconstructing the ground truth communities in the benchmark graphs. The results are shown in Table 2. The NMI is computed using publicly available implementation of the NMI technique, for $F_1$ distributed computing was used to scale the computation to large community outputs.

TABLE 2

Accuracy in synthetic benchmarks

| Graph | Ego-splitting | | DEMON | | OLP | |
|---|---|---|---|---|---|---|
| | F1 | NMI | F1 | NMI | F1 | NMI |
| Benchmark-0.01 | 0.9368 | 0.9403 | 0.4765 | 0.1670 | 0.6254 | 0.3149 |
| Benchmark-0.1 | 0.7878 | 0.7100 | 0.1200 | 0.0000 | 0.7723 | 0.5571 |
| Benchmark-0.3 | 0.6714 | 0.5076 | 0.1216 | 0.0000 | 0.6151 | 0.4405 |

It is possible to observe that the ego-splitting method using label propagation as clustering algorithm outperforms all other benchmark methods in all the graphs evaluated and in both accuracy measures. Notice how in particular for the benchmark graph Benchmark-0.01 the ego-splitting technique achieves close to >93% $F_1$ compared to 47% of DEMON.

Results on Real Graphs

Figure 5A:
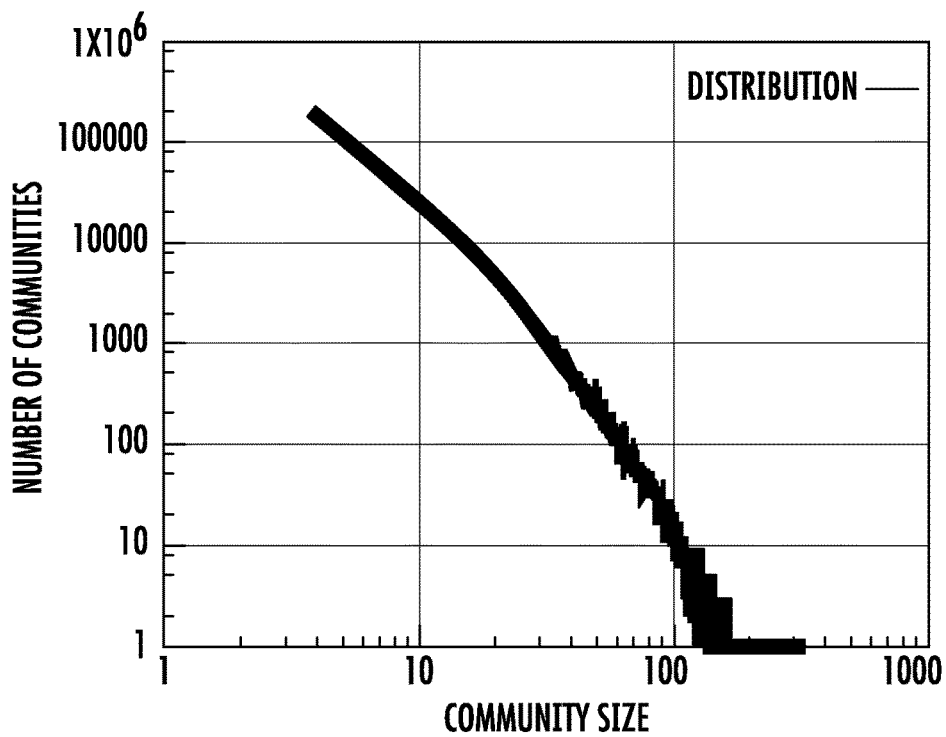
FIGS. 5A-B depict plots of example statistics according to example embodiments of the present disclosure.

First, statistics on the communities identified by the ego-splitting algorithm are reported. FIG. 5A shows the distribution of the size of the overlapping communities identified by the ego-splitting algorithm on the largest social network analyzed Friendster. Notice how the distribution of community sizes follows a clear heavy tailed distribution (the plot is in log scale, the other graphs have similar distributions). This is consistent with previous results in social networks. Consistent with previous studies most communities have <100 nodes. In total the ego-splitting algorithm outputs the following number of communities in the graphs analyzed: amazon 27,004; dblp 33,626; livejournal 49,954; orkut 131,773; friendster 905,520; clueweb 31,642,414.

Figure 5B:
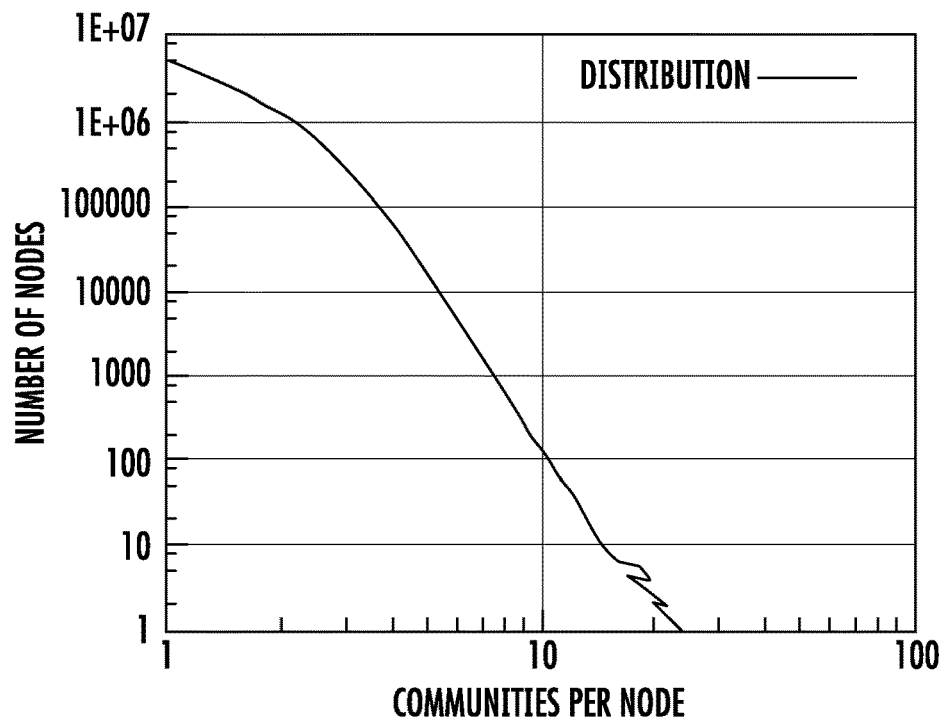

FIG. 5B shows for the same graph the distribution of the number of communities to which a node belongs in the output of the ego-splitting technique. Notice that a large fraction of nodes belong to more than one community (~30% in Friendster) and that again the distribution of participation of nodes in multiple communities is heavy tailed.

Accuracy: Next, the accuracy of the ego-splitting method in real-world graphs with ground-truth communities is reported. The results are in Table 3. Consistent with the results in the random graphs, the ego-splitting method outperforms the other two methods in almost all cases. In particular, the ego-splitting method consistently achieves the highest $F_1$ score and in all but one case has the best NMI score. This confirms the theoretical results that show that splitting the ego's in node element allows the overlapping community structure to be more easily detectable.

TABLE 3

Accuracy in real-world graphs

| Graph | Ego-splitting | | DEMON | | OLP | |
|---|---|---|---|---|---|---|
| | F1 | NMI | F1 | NMI | F1 | NMI |
| amazon | 0.0374 | 0.0809 | 0.0337 | 0.0310 | 0.0339 | 0.0450 |
| dblp | 0.1662 | 0.1041 | 0.1539 | 0.0309 | 0.1448 | 0.0645 |
| livejournal | 0.0490 | 0.0394 | — | — | 0.0115 | 0.0148 |
| orkut | 0.0332 | 0.0060 | — | — | 0.0267 | 0.0129 |
| friendster | 0.0051 | 0.0008 | — | — | 0.0010 | 0.0006 |

Results for DEMON on large graphs are omitted as the algorithm did not finish running in the allocated time (the method employed a slow post-processing which is not scalable in large graphs).

Scalability

Figure 6:
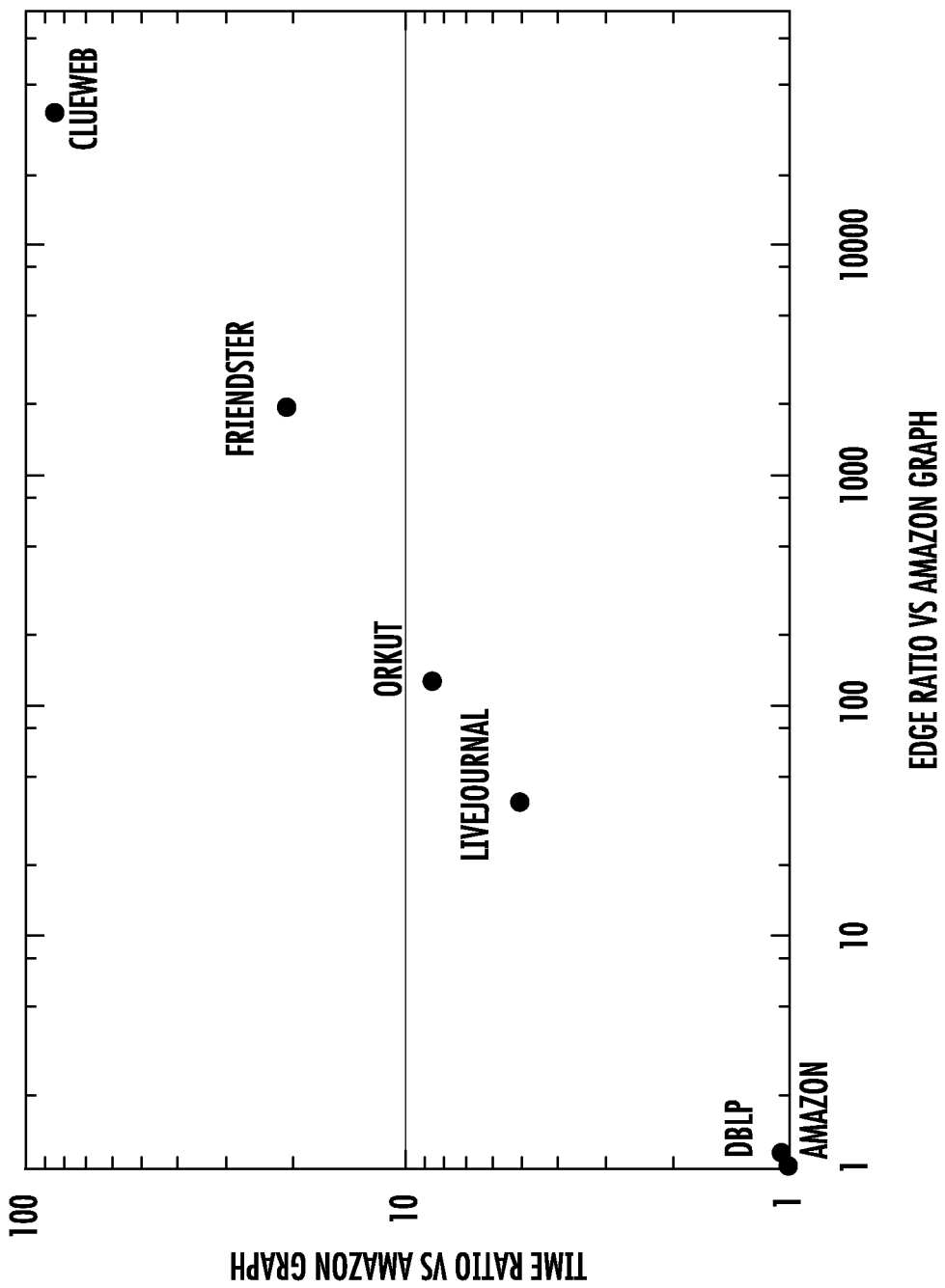
FIG. 6 depicts a plot of running time versus size of the graph according to example embodiments of the present disclosure.

Finally the scalability of the ego-splitting method is evaluated. In FIG. 6 the relationship between the total running time of the ego-splitting algorithm (total wall-clock time of the distributed execution) and the size of the graph is illustrated. The results are reported as a ratio of the time used to process a graph (resp. number of edges of the graph) and the time used to process the smaller graph amazon (resp. number of edges in amazon). It is possible to observe the high scalability of the ego-splitting method. Even if clueweb has 30000 times more edges, the execution time is only 80 times longer that of amazon. This shows that the ego-splitting method can scale to very large graphs with billions of nodes and edges.

Example Devices and Systems

Figure 7:
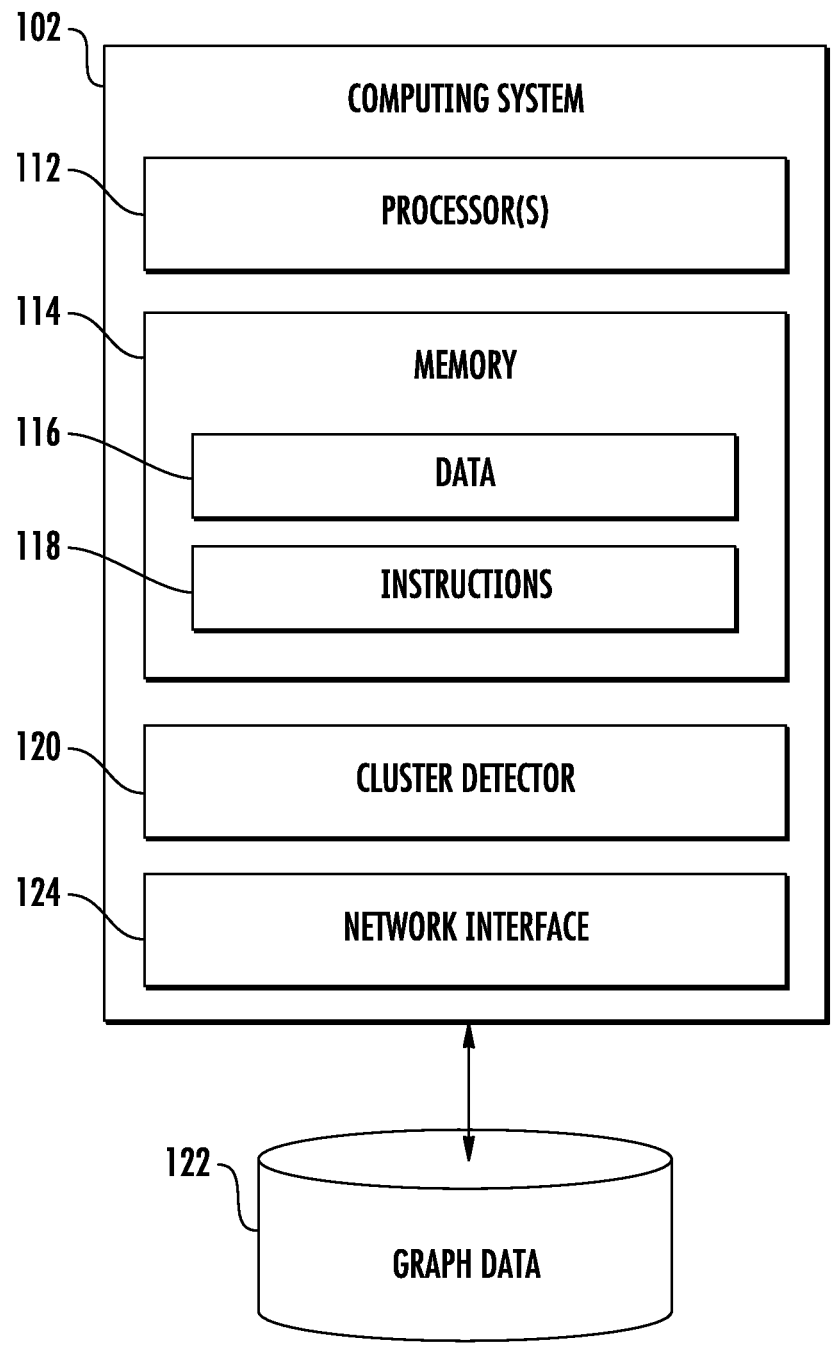
FIG. 7 depicts a block diagram of an example computing system to detect clusters in graphs according to example embodiments of the present disclosure.

FIG. 7 depicts an example computing system 102 that can implement the present disclosure. The computing system 102 can include one or more physical computing devices. The one or more physical computing devices can be any type of computing device, including a server computing device, a personal computer (e.g., desktop or laptop), a mobile computing device (e.g., smartphone or tablet), an embedded computing device, or other forms of computing devices, or combinations thereof. The computing device(s) can operate sequentially or in parallel. In some implementations, the computing device(s) can implement various distributed computing techniques.

The computing system includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor(s) 112 to cause the computing system 102 to perform operations.

The computing system 102 can further include a cluster detector 120 that is implementable to detect clusters in graphs. In particular, the computing system 102 can implement the cluster detector 120 to detect clusters within a graph that is represented by graph data 122 that is stored in a database. For example, the cluster detector 120 can perform any of the example methods, techniques, or frameworks discussed herein on the graph data 122 to detect clusters within the corresponding graph.

The cluster detector 120 can include computer logic utilized to provide desired functionality. The cluster detector 120 can be implemented in hardware, firmware, and/or software controlling a general purpose processor. For example, in some implementations, the cluster detector 120 includes program files stored on a storage device, loaded into a memory and executed by one or more processors. In other implementations, the cluster detector 120 includes one or more sets of computer-executable instructions that are stored in a tangible computer-readable storage medium such as RAM hard disk or optical or magnetic media.

The computing system 102 can also include a network interface 124 used to communicate with one or more systems or devices, including systems or devices that are remotely located from the computing system 102. The network interface 124 can include any number of components to provide networked communications (e.g., transceivers, antennas, controllers, cards, etc.).

Example Methods

Figure 8:
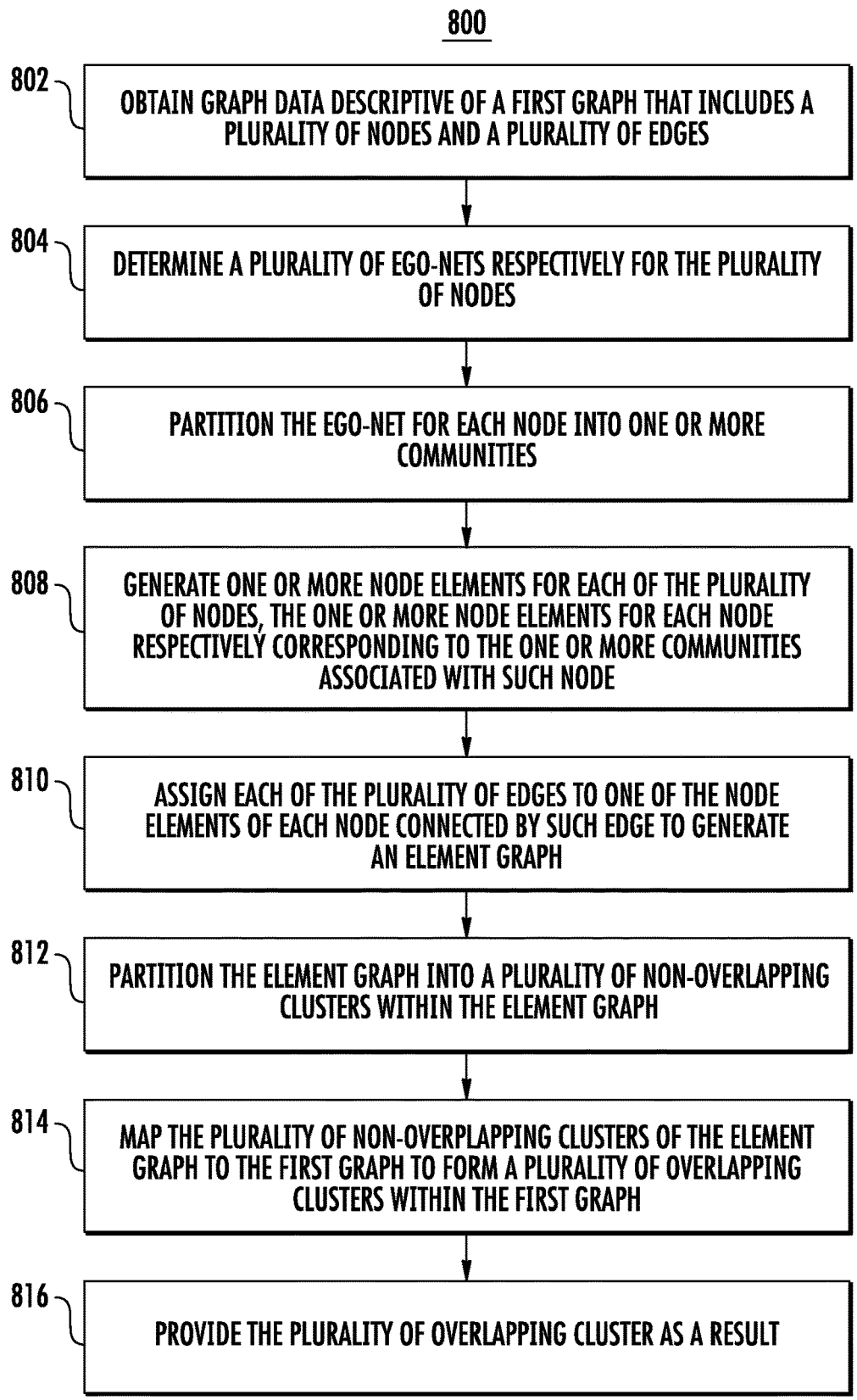
FIG. 8 depicts a flow chart diagram of an example method to detect clusters in graphs according to example embodiments of the present disclosure.

FIG. 8 depicts a flow chart diagram of an example method 800 to detect clusters in graphs according to example embodiments of the present disclosure.

At 802, a computing system obtains graph data descriptive of a first graph that includes a plurality of nodes and a plurality of edges. For example, each edge can connect two of the nodes. In some implementations, the first graph can be an undirected graph.

At 804, the computing system determines a plurality of ego-nets respectively for the plurality of nodes. In some implementations, determining the plurality of ego-nets respectively for the plurality of nodes at 804 can include determining, for each of the plurality of nodes, a subgraph induced by a neighborhood of such node.

At 806, the computing system partitions the ego-net for each node into one or more communities. For example, the computing system can use a first partitioning algorithm on the ego-net for each node. As one example, the first partitioning algorithm can be the connected components algorithm. In some implementations, the ego-net for at least one of the nodes can be partitioned into two or more communities.

At 808, the computing system generates one or more node elements for each of the plurality of nodes. The one or more node elements for each node can respectively correspond to the one or more communities associated with such node.

At 810, the computing system assigns each of the plurality of edges to one of the node elements of each node connected by such edge to generate an element graph. In some implementations, assigning each of the plurality of edges to one of the node elements of each node connected by such edge at 810 can include assigning each edge to the node element of each node connected by such edge that corresponds to the community to which such edge belongs.

At 812, the computing system partitions the element graph into a plurality of non-overlapping clusters within the element graph. For example, the computing system can use a second partitioning algorithm on the ego-net for each node. The second partitioning algorithm can be the same as or different from the first partitioning algorithm. As one example, the second partitioning algorithm can be the connected components algorithm.

At 814, the computing system maps the plurality of non-overlapping clusters of the element graph to the first graph to form a plurality of overlapping clusters within the first graph.

At 816, the computing system provides the plurality of overlapping clusters as a result. For example, the computing system can provide the plurality of overlapping clusters to another computing device; provide the plurality of overlapping clusters for display; and/or store the plurality of overlapping clusters as the result of the method 800.

In other implementations, in addition or alternatively to blocks 814 and/or 816, the computing device can provide the plurality of non-overlapping clusters of the element graph as a result. For example, the computing system can provide the plurality of non-overlapping clusters to another computing device; provide the plurality of non-overlapping clusters for display; and/or store the plurality of non-overlapping clusters as the result of the method 800.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 8 depicts steps performed in a particular order for purposes of illustration and discussion, the methods of the present disclosure are not limited to the particularly illustrated order or arrangement. The various steps of method 800 can be omitted, rearranged, combined, and/or adapted in various ways without deviating from the scope of the present disclosure.

What is claimed is:

1. A method for detecting clusters in graphs, the method comprising:
   obtaining, by one or more computing devices, graph data descriptive of a first graph that comprises a plurality of nodes and a plurality of edges, each edge of the plurality of edges connecting two nodes of the plurality of nodes;

determining, by the one or more computing devices, a plurality of ego-nets respectively for the plurality of nodes, wherein each ego-net of the plurality of ego-nets corresponds to a separate node of the plurality of nodes;

partitioning, by the one or more computing devices, the corresponding ego-net for each node of the plurality of nodes into one or more communities, wherein at least a first ego-net of the plurality of nodes corresponds to a first node of the plurality of nodes and is partitioned into two or more communities that includes at least a first community and a second community, wherein the first community is different from the second community;

generating, by the one or more computing devices, one or more node elements for each node of the plurality of nodes, each node element of the one or more node elements for the node corresponding to a separate community of the one or more communities for the ego-net corresponding to the node, wherein in response to the first ego-net being partitioned into two or more communities, two or more node elements are generated for the first node such that a first node element of the two or more node elements corresponds to the first community of the two or more communities for the first ego-net and a second node element of the two or more node elements corresponds to the second community of the two communities of more communities for the first ego-net;

assigning, by the one or more computing devices, each edge of the plurality of edges to one of the node elements of each node connected by such edge to generate an element graph, wherein at least a first edge connected to the first node is assigned to only the first node of the two or more node elements for the first node;

partitioning, by the one or more computing devices, the element graph into a plurality of clusters; and providing, by the one or more computing devices, the plurality of clusters as a result that includes a reduction of an overlapping cluster structure of the first graph to a non-overlapping cluster structure of the first graph; and detecting, by the one or more computing devices, one or more events and one or more messages within a set of data based on the reduction of the overlapping cluster structure to the non-overlapping cluster structure.

2. The method of claim 1, wherein determining, by the one or more computing devices, the plurality of ego-nets respectively for the plurality of nodes comprises determining, by the one or more computing devices, for each node of the plurality of nodes, a subgraph induced by a neighborhood of such node.

3. The method of claim 1, wherein assigning, by the one or more computing devices, each edge of the plurality of edges to one of the node elements of each node connected by such edge comprises assigning, by the one or more computing devices, each edge to the node element of each node connected by such edge that corresponds to a community to which such edge belongs.

4. The method of claim 1, wherein: partitioning, by the one or more computing devices, the element graph into the plurality of clusters comprises partitioning, by the one or more computing devices, the element graph into a plurality of non-overlapping clusters within the element graph; and providing, by the one or more computing devices, the plurality of clusters as the result comprises providing, by the one or more computing devices, the plurality of non-overlapping clusters as the result.

5. The method of claim 1, wherein: partitioning, by the one or more computing devices, the element graph into the plurality of clusters comprises: partitioning, by the one or more computing devices, the element graph into a plurality of non-overlapping clusters within the element graph; and mapping, by the one or more computing devices, the plurality of non-overlapping clusters of the element graph to the first graph to form a plurality of overlapping clusters within the first graph; and providing, by the one or more computing devices, the plurality of clusters as the result comprises providing, by the one or more computing devices, the plurality of overlapping clusters as the result.

6. The method of claim 1, wherein partitioning, by the one or more computing devices, the ego-net for each node into one or more communities comprises using, by the one or more computing devices, a first partitioning algorithm on the ego-net for each node.

7. The method of claim 1, wherein partitioning, by the one or more computing devices, the element graph into the plurality of clusters comprises using, by the one or more computing devices, a second partitioning algorithm on the element graph.

8. The method of claim 1, wherein: partitioning, by the one or more computing devices, the ego-net for each node into one or more communities comprises using, by the one or more computing devices, a first partitioning algorithm on the ego-net for each node; and partitioning, by the one or more computing devices, the element graph into the plurality of clusters comprises using, by the one or more computing devices, a second partitioning algorithm on the element graph; wherein the second partitioning algorithm is the same algorithm as the first partitioning algorithm.

9. The method claim 1, wherein: partitioning, by the one or more computing devices, the ego-net for each node into one or more communities comprises using, by the one or more computing devices, a first partitioning algorithm on the ego-net for each node; and partitioning, by the one or more computing devices, the element graph into the plurality of clusters comprises using, by the one or more computing devices, a second partitioning algorithm on the element graph; wherein the second partitioning algorithm is a different algorithm from the first partitioning algorithm.

10. The method of claim 1, wherein: partitioning, by the one or more computing devices, the ego-net for each node into one or more communities comprises using, by the one or more computing devices, a first partitioning algorithm on the ego-net for each node; and partitioning, by the one or more computing devices, the element graph into the plurality of clusters comprises using, by the one or more computing devices, a second partitioning algorithm on the element graph; wherein one or both of the first partitioning algorithm and the second partitioning algorithm comprises a connected component algorithm.

11. The method of claim 1, wherein obtaining, by the one or more computing devices, the graph data descriptive of the graph comprises obtaining, by the one or more computing devices, the graph data descriptive of an undirected graph, the plurality of edges comprising undirected edges.

12. The method of claim 1, wherein the set of data includes a set of electronic messages and the one or more events includes a spam message within the set of electronic messages.

13. A computing system, comprising: one or more processors; and one or more tangible, non-transitory computer-readable media that collectively store instructions that, when executed by the one or more processors, cause the one or more processors to perform operations, the operations comprising:

obtaining graph data descriptive of a first graph that comprises a plurality of nodes and a plurality of edges, each edge of the plurality of edges connecting two nodes of the plurality of nodes;

determining a plurality of ego-nets respectively for the plurality of nodes, wherein each ego-net of the plurality of ego-nets corresponds to a separate node of the plurality of nodes;

partitioning the corresponding ego-net for each node of the plurality of nodes into one or more communities, wherein at least a first ego-net of the plurality of nodes corresponds to a first node of the plurality of nodes and is partitioned into two or more communities that includes at least a first community and a second community, wherein the first community is different from the second community;

generating one or more node elements for each node of the plurality of nodes, each node element of the one or more node elements for the node corresponding to a separate community of the one or more communities for the ego-net corresponding to the node, wherein in response to the first ego-net being partitioned into two or more communities, two or more node elements are generated for the first node such that a first node element of the two or more node elements corresponds to the first community of the two or more communities for the first ego-net and a second node element of the two or more node elements corresponds to the second community of the two of more communities for the first ego-net;

assigning each edge of the plurality of edges to one of the node elements of each node connected by such edge to generate an element graph, wherein at least a first edge connected to the first node is assigned to only the first node of the two or more node elements for the first node;

partitioning the element graph into a plurality of clusters;

providing the plurality of clusters as a result that includes a reduction of an overlapping cluster structure of the first graph to a non-overlapping cluster structure of the first graph; and detecting one or more events and one or more messages within a set of data based on the reduction of the overlapping cluster structure to the non-overlapping cluster structure.

14. The computing system of claim 13, wherein determining the plurality of ego-nets respectively for the plurality of nodes comprises determining for each node of the plurality of nodes, a subgraph induced by a neighborhood of such node.

15. The computing system of claim 13, wherein: partitioning the element graph into the plurality of clusters comprises partitioning the element graph into a plurality of non-overlapping clusters within the element graph; and providing the plurality of clusters as the result comprises providing the plurality of non-overlapping clusters as the result.

16. The computing system of claim 13, wherein: partitioning the element graph into the plurality of clusters comprises: partitioning the element graph into a plurality of non-overlapping clusters within the element graph; and mapping the plurality of non-overlapping clusters of the element graph to the first graph to form a plurality of overlapping clusters within the first graph; and providing the plurality of clusters as the result comprises providing the plurality of overlapping clusters as the result.

17. The computing system of claim 13, wherein assigning each of the plurality of edges to one of the node elements of each node connected by such edge comprises assigning each edge to the node element of each node connected by such edge that corresponds to the community to which such edge belongs.

18. One or more tangible, non-transitory computer-readable media that collectively store instructions that, when executed by one or more processors, cause the one or more processors to perform operations, the operations comprising:

obtaining, by one or more computing devices, graph data descriptive of a first graph that comprises a plurality of nodes and a plurality of edges, each edge of the plurality of edges connecting two nodes of the plurality of nodes;

determining, by the one or more computing devices, a plurality of ego-nets respectively for the plurality of nodes, wherein each ego-net of the plurality of ego-nets corresponds to a separate node of the plurality of nodes;

partitioning, by the one or more computing devices, the corresponding ego-net for each node of the plurality of nodes into one or more communities, wherein at least a first ego-net of the plurality of nodes corresponds to a first node of the plurality of nodes and is partitioned into two or more communities that includes at least a first community and a second community, wherein the first community is different from the second community;

generating, by the one or more computing devices, one or more node elements for each node of the plurality of nodes, each node element of the one or more node elements for the node corresponding to a separate community of the one or more communities for the ego-net corresponding to the node, wherein in response to the first ego-net being partitioned into two or more communities, at two or more node elements are generated for the first node such that a first node element of the two or more node elements corresponds to the first community of the two or more communities for the first ego-net and a second node element of the two or more node elements corresponds to the second community of the two of more communities for the first ego-net;

assigning, by the one or more computing devices, each edge of the plurality of edges to one of the node elements of each node connected by such edge to generate an element graph, wherein at least a first edge connected to the first node is assigned to only the first node of the two or more node elements for the first node;

partitioning, by the one or more computing devices, the element graph into a plurality of clusters;

providing, by the one or more computing devices, the plurality of clusters as a result that includes a reduction of an overlapping cluster structure of the first graph to a non-overlapping cluster structure of the first graph; and detecting, by the one or more computing devices, one or more events and one or more messages within a set of data based on the reduction of the overlapping cluster structure to the non-overlapping cluster structure.

19. The one or more tangible, non-transitory computer-readable media of claim 18, wherein determining, by the one or more computing devices, the one or more ego-nets respectively for the one or more analyzed nodes comprises determining, by the one or more computing devices, for each node of the one or more analyzed nodes, a subgraph induced by a neighborhood of such node.

20. The one or more tangible, non-transitory computer-readable media of claim 18, wherein mapping, each edge that connects to one of the analyzed nodes to one of the node elements of such analyzed node comprises assigning, by the one or more computing devices, each edge that connects to one of the analyzed nodes to the node element of such node that corresponds to the community to which such edge belongs.

21. The one or more tangible, non-transitory computer-readable media of claim 18, wherein the set of data includes a set of electronic messages and the one or more events includes a spam message within the set of electronic messages.

* * * * *